US 6,669,148 B2

(12) United States Patent
Anderman et al.

(10) Patent No.: US 6,669,148 B2
(45) Date of Patent: Dec. 30, 2003

(54) METHOD AND APPARATUS FOR SUPPLYING ORBITAL SPACE PLATFORMS USING PAYLOAD CANISTERS VIA INTERMEDIATE ORBITAL RENDEZVOUS AND DOCKING

(75) Inventors: David Anderman, Laguna Hills, CA (US); Benigno Muniz, Simi Valley, CA (US)

(73) Assignee: Constellation Services International, Inc., Woodland Hills, CA (US)

( * ) Notice: Subject to any disclaimer, the term of this patent is extended or adjusted under 35 U.S.C. 154(b) by 0 days.

(21) Appl. No.: 10/093,971

(22) Filed: Mar. 7, 2002

(65) Prior Publication Data

US 2003/0164428 A1 Sep. 4, 2003

Related U.S. Application Data

(60) Provisional application No. 60/274,127, filed on Mar. 7, 2001.

(51) Int. Cl.[7] .................................................. B64G 1/64
(52) U.S. Cl. ..................... 244/161; 244/159; 244/158 R
(58) Field of Search ............................ 244/158 R, 159, 244/160, 161, 164, 169

(56) References Cited

U.S. PATENT DOCUMENTS

| | | | | |
|---|---|---|---|---|
| 4,057,207 A | * | 11/1977 | Hogan ......................... 244/159 |
| 4,471,926 A | * | 9/1984 | Steel, III ................. 244/158 R |
| 4,715,566 A | * | 12/1987 | Nobles ........................ 244/159 |
| 4,872,625 A | * | 10/1989 | Filley ......................... 244/159 |
| 4,903,919 A | * | 2/1990 | Johnson et al. ............. 244/159 |
| 6,293,500 B1 | * | 9/2001 | Bigelow ................. 244/158 R |

* cited by examiner

Primary Examiner—Michael J. Carone
Assistant Examiner—Gabriel S. Sukman
(74) Attorney, Agent, or Firm—Philip H. Albert; Townsend and Townsend and Crew, LLP (57) ABSTRACT

In a space platform supply system, a canister containing supply for a space platform is launched into orbit using a launch vehicle. An intermediate space vehicle rendezvous and docks with the canister while the attached launch vehicle provides the necessary orbit maintenance and stabilization to enable the docking. After docking, the intermediate space vehicle detaches the canister from the launch vehicle element or the launch vehicle element may initiate detachment from the intermediate space vehicle/canister. In either event, the intermediate space vehicle then can provide propulsion and attitude control to allow the canister to be transported to and docked with the space platform being supplied, thus eliminating the need for the canister to include propulsion and attitude control of its own.

32 Claims, 8 Drawing Sheets

METHOD AND APPARATUS FOR SUPPLYING ORBITAL SPACE PLATFORMS USING PAYLOAD CANISTERS VIA INTERMEDIATE ORBITAL RENDEZVOUS AND DOCKING

FIELD OF THE INVENTION

The present invention relates to methods and apparatus for transfer of goods and supply to space platforms in general, and more specifically to systems wherein the goods and supply are contained within reusable devices.

BACKGROUND OF THE INVENTION

Orbital operations are expensive and complex. One reason for this is that all the goods and supply needed for an operation needs to be supplied from somewhere else, either another orbit or from the ground. Another reason is that, in orbit, everything is in motion, including space objects and debris from prior human operations. Yet another reason is that orbital environments are harsh, with excessive radiation and vacuum present.

With everything in orbit being in motion, consideration needs to be given to rendezvous and changes in orbit. Some objects, such as space probes and some satellites might not have any propulsion systems and are left to the orbits where they are placed. Of course, some such devices might change orbits over time due to drag or other collisions or other perturbations. Other objects have their own propulsion systems, allowing them to make minor adjustments, such as needed to stay in a given orbit, or major adjustments that allow them to change orbits and/or change positions relative to other objects. For example, the Space Shuttle has a propulsion system that allows it to maneuver around other objects in orbit and change orbits (including the extreme case of a change in orbit from an orbital position above the Earth to a ground position on Earth).

One scheme for performing operations in orbit is the use of a space platform (also referred to herein as a "platform"). A space platform is launched and placed in an orbit or is constructed in orbit from parts launched from Earth, or possibly from components and/or construction materials from nonterrestrial sources. Once in place, the space platform serves as a base for the operations. Such operations might include space exploration, experimentation, satellite maintenance or construction, or other operations suited for performance in orbit. One example of a space platform is the International Space Station (ISS) being put into operation by a consortium of countries. Other examples include the Mir and Skylab-type space stations.

In some cases, space vehicles or space-bound objects might be considered space platforms, either permanently or temporarily. For example, while in orbit, the U.S. Space Shuttle serves as a temporary space platform for satellite recovery operations and research. In addition to government-funded platforms, several private companies are planning to develop and put into operation commercial space platforms. In some cases, a satellite or other orbiting object could be considered a platform, but typically a space platform provides for human occupation.

As part of the construction, repair and/or operation of a space platform, the space platform normally requires initial supply and resupply (generically referred to herein as "supply"). In some cases, such as where the platform is a temporary space platform, the mission of the platform might be fully supplied at the outset for a self-sufficient mission, but more typically, a space platform needs supply. Permanent space platforms, such as the ISS, typically require significant logistics for supply. In fact, as the ISS becomes fully operational, the amount of goods required to service the ISS might well exceed the capacity of current baselined ISS service vehicles such as the Space Shuttle.

As used herein, the term "supply" can refer to the provision of multiple kinds of goods to a platform. These include logistical supplies needed by the platform, such as food, water, air, propellant or other consumables, or equipment to provide additional capabilities such as power or on-board computing for experiments, or platform housekeeping functions. Supply can also mean provision of additional pressurized or unpressurized storage capability. In addition, supply can also include materials needed for purposes beyond the platform, such as propellant for or parts of other spacecraft that would be assembled and/or serviced at or beyond the platform itself. In some arrangements, supply can also include crew, i.e., where a supply mission includes the transport of fresh crew as replacements for crew already at the space platform.

Much literature and prior art exists on the subject of supply.

Some actually implemented systems include canisters for carrying cargo into space, such as the Long Exposure Duration Facility (LDEF), launched Apr. 7, 1984 on Space Shuttle mission STS 41-C, and returned to Earth on Jan. 20, 1990 on Space Shuttle mission STS-32. However, LDEF remained in its initial orbit until it was picked up by the Space Shuttle and was returned to Earth, and was not transferred to another orbit to deliver cargo to a space platform.

U.S. Pat. Nos. 4,834,324 and 5,217,187 show a space transportation system comprising modular units that could include a payload canister. However, that disclosure only addressed the placement of the payload canister into an initial orbit, where it presumably would have remained unless it moved to another orbit with its own propulsive capability, if available.

U.S. Pat. No. 4,471,926 describes a method for a launch vehicle upper stage (space transfer vehicle), for use in connection with a satellite to be moved from a launch vehicle's orbit into another orbit, of segregating the main propulsive capability of the satellite from the satellite's payload functions by placing the function with the space transfer vehicle. However, that satellite was expensive and heavy as it carried its own housekeeping functions and subsystems, such as attitude control, so that it could function as an independent vehicle once the transfer vehicle had detached from the satellite.

U.S. Pat. Nos. 5,152,482 and 5,271,582 show the use of a standardized spacecraft bus for segregating various subsystem functions, such as main propulsion and attitude control, from pre-integrated payloads.

U.S. Pat. No. 5,429,328 shows a spacecraft payload exchange system that employs a servicing vehicle, a plurality of canisters and the exchange of material-containing canisters from the servicing vehicle to a space platform and vice versa using a docking method. However, the initial transfer of canisters occurs directly at the space platform, with the servicing vehicle using the direct transportation method from the launch vehicle to the space platform, which does not avoid the problems of direct transportation.

U.S. Pat. No. 4,880,187 shows the transfer of a spacecraft from one orbit to another.

U.S. Pat. No. 4,964,596 shows a spacecraft payload module with a fitting at one end that is assembled on-orbit with a bus module using the Space Shuttle. However, the payload module is assembled with the bus module using a robotic arm which generally requires operator assistance and its stabilizing and propulsive ability is limited.

U.S. Pat. Nos. 6,149,104, 6,193,193 and 6,322,023 show provision of space platform rendezvous functions for a cargo module using a separate space tug. However, these methods all use the direct transportation method from the launch vehicle to the space platform, which is disadvantageous for the reasons described herein.

Furthermore, Waltz, Donald M., *On-Orbit Servicing of Space Systems*, (Krieger Publishing) illustrates a launch of an unpressurized cargo carrier carrying supplies to a space platform using a space tug with a spin-stabilized upper stage.

Collins, John T., et. al., *Small Orbit Transfer Vehicle (OTV) for On-Orbit Satellite Servicing and Resupply*, 15th Annual AIAA/USU Conference on Small Satellites, Aug. 13–16, 2001, specifically describes using a space tug to retrieve a payload canister that has been placed into orbit by a launch vehicle upper stage, and transporting that canister to a space platform (specifically ISS). However, there the space tug is attached to the space platform by a robotic arm, limiting its usefulness and requiring human intervention. An additional use of the robotic arm might be required to then berth the payload canister to the space platform.

Intermodal transport of containers in a terrestrial environment is common. For example, consumer goods transported in part by ship are often packed into standardized containers, placed on ships, offloaded at a destination port onto trains, and then offloaded onto trucks for delivery to their final destination. U.S. Pat. Nos. 3,027,025, 3,456,829 and 3,966,075 described such intermodal terrestrial transport. Of course, terrestrial transport, intermodal or otherwise, is much simpler that space transport.

In the typical space platform supply process, elements of which are described in the above references, the supply is part of a payload attached to a launch vehicle that is launched from Earth into the launch vehicle's orbit. Of course, what remains in orbit might only a launch vehicle element, such as the upper stage of the launch vehicle, with the payload attached thereto. The launch vehicle, or what remains of it, includes a propulsion module, means or section and a cargo module, means or section, integrated as a unit. The Russian Soyuz launch vehicle and Progress spacecraft are an example of such an integrated unit.

The integrated unit approaches the space platform and attaches to the space platform for transfer of the cargo into the platform. The attachment could be via a docking maneuver, via berthing of the entire integrated unit to the space platform using a robotic arm, via attachment of the cargo module of the integrated unit to the space platform using a robotic arm, via attachment of the cargo module to the space platform by crew performing extra-vehicular activity (EVA), or similar approaches.

The Space Shuttle/SpaceHab/Multi-Purpose Logistics Module (MPLM) system is an example of one approach. In that system, the entire launch vehicle element, with the cargo module attached, directly travels to and docks with the space platform. The cargo can be stored within the launch vehicle (i.e., the Space Shuttle) and transferred by its crew into the space platform after docking, stored in a cargo module inside the Space Shuttle (e.g., a SpaceHab or SpaceLab module) or stored in a cargo module that is transferred from the Space Shuttle payload bay and berthed using a robotic arm to a port at the space platform where the cargo can be later transferred by the crew. In the history of space platforms, actual implementation of logistics supply has been via this direct transportation method using an integrated propulsion/cargo unit.

Plans to augment the ISS supply chain currently call for development of new vehicles that also use this direct transport method. Examples of such plans include the European Ariane 5 launch vehicle with an "Automated Transfer Vehicle" using direct transport and docking, and the Japanese H2A launch vehicle with a "H2 Transfer Vehicle" using direct transport and berthing, and a variety of other concepts now being developed by U.S. companies. These new developments will be very costly, with investments required in excess of $100 million for each project.

Clearly, there is a need for inexpensive supply as it is a significant cost of many missions.

SUMMARY OF THE INVENTION

In a space platform supply system according to aspects of the present invention, a canister containing supply for a space platform is launched into orbit using a launch vehicle. An intermediate space vehicle rendezvous and docks with the canister while the attached launch vehicle provides the necessary orbit maintenance and stabilization to enable the docking. After docking, the intermediate space vehicle detaches the canister from the launch vehicle element or the launch vehicle element may initiate detachment from the intermediate space vehicle/canister. In either event, the intermediate space vehicle then can provide propulsion and attitude control to allow the canister to be transported to and docked with the space platform being supplied, thus eliminating the need for the canister to include propulsion and attitude control of its own.

The canister is preferably standardized such that it can be launched using a wide variety of launch vehicles and is configured so as to not require redesign or modification of the launch vehicles used. Also, the canister is preferably standardized such that it can be attached to a wide variety of space platforms. The canister need not have provision for its own propulsion or attitude control, but can rely solely upon the attached element of the launch vehicle for those functions.

The launch vehicle can be single-stage or multistage, expendable or reusable. The launch vehicle includes attitude control to stabilize the launch vehicle (and the attached canister enough to allow the intermediate space vehicle to attach to the canister. Typically, this is done by the launch vehicle maintaining a three-axis stabilized position relative to the approaching intermediate space vehicle.

The intermediate space vehicle can be a space tug that is attached to the space platform when not in use, in which case the intermediate space vehicle would depart from the space platform to rendezvous and dock with the canister while attached to the launch vehicle and the launch vehicle can detach from the canister once the canister is attached to the intermediate space vehicle.

In a specific embodiment, the canister includes docking mechanisms at two locations, such as at each end of an approximately cylindrical canister, to allow for simultaneous docking with the intermediate space vehicle and with the space platform. The docking mechanisms can be the standard "probe and cone" docking mechanisms, or one or both might be designed as docking ports according to the Androgynous Peripheral Attachment System (APAS) or the Hybrid system. In yet another variation, the intermediate space vehicle itself could initially be outfitted with an alternate mechanism, such as APAS, and the canister would contain at least one compatible mechanism.

Advantages of this docking mechanism design is in allowing "mix and match" canister docking mechanisms for greater flexibility in the use and placement of the canisters at the platform, and allowing the canister to become an "adapter" for converting one type of docking mechanism at the space platform to another with no net loss in the total number of docking ports. However, although a specific docking port is described and illustrated, other docking ports might be used instead.

The canister may include associated rendezvous sensors at both ends to support the intermediate space vehicle and space platform needs, such as radar and/or signalling extensions. Rendezvous electronics may be located in the launch vehicle element, the intermediate space vehicle, the canister, or a combination thereof. One advantage of such sensors and extensions is that they permit larger diameter canisters so that the "launch vehicle element to intermediate space vehicle" signalling and the "intermediate space vehicle to space platform" signalling did not have to go around the canister or be blocked by a large diameter canister.

Yet another advantage of the present invention is that, by having the launch vehicle element and/or the intermediate space vehicle provide propulsion and attitude stabilization functions, redundant systems can be eliminated, thus saving costs. Removal of such systems allows the canister to be launched on a smaller class of launch vehicles for a given amount of cargo or allows for more cargo for a given class of launch vehicle.

A better understanding of the features and advantages of the present invention will be obtained by reference to the following detailed description that sets forth illustrative embodiments and the accompanying drawings.

BRIEF DESCRIPTION OF THE DRAWINGS

FIG. 1(a) illustrates a launch vehicle; FIG. 1(b) illustrates a launch vehicle element attached to a canister; FIG. 1(c) illustrates the canister attached to the launch vehicle element and a space tug; FIG. 1(d) illustrates the canister attached to just the space tug; and FIG. 1(e) illustrates the canister attached to the space tug and a space platform.

FIG. 3 illustrates various components as might be used in a transport sequence.

FIG. 4 Illustrates the canister.

DESCRIPTION OF THE SPECIFIC EMBODIMENTS

Figure 1:
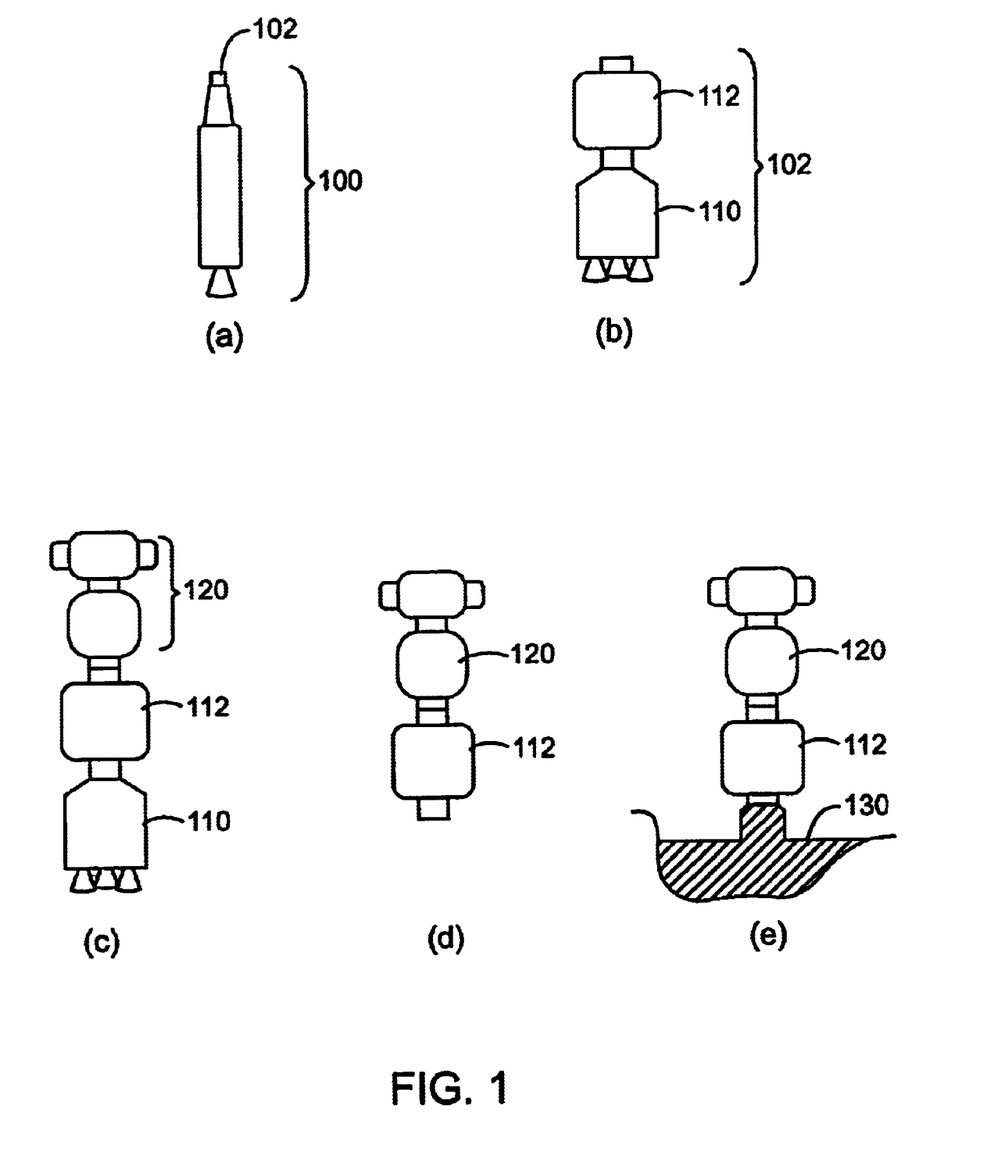
FIG. 1 illustrates various arrangements of components of a transport system.

FIG. 1 illustrates various arrangements of components of a transport system 100. As shown there, a launch vehicle 100 includes an upper stage 102, which encloses a launch vehicle element 110 and a canister 112. As used herein, a "launch vehicle element" is all or part of that which launched the element into space. Nearly always, the launch vehicle element is less than the entire launch vehicle, as spent or unneeded stages would fall away during ascent. However, it should be understood that the present invention does not require that some of the launch vehicle falls away or that the entire launch vehicle is present. Unless otherwise indicated herein, what is stated about a "launch vehicle" or a "launch vehicle element" can be taken to apply to the both or either.

As shown in FIG. 1(c), canister 112 is such that it can attach to launch vehicle element 110 and a space tug 120 at the same time. A space tug typically resides docked to the space platform when not in use, or is docked at some other orbit or platform, and then detaches to go out and pick up a canister. U.S. Pat. No. 6,364,252, which is incorporated by reference herein for all purposes, discloses such a space tug. It should be understood that some other intermediate space vehicle that is not considered a space tug per se might be substituted for a space tug.

FIG. 1(d) shows the elements of FIG. 1(c), without launch vehicle element 110. Once canister 112 is attached to space tug 120, launch vehicle element 110 can fall away and be destroyed or recovered. As shown in FIG. 1(e), canister 112 is such that it can attach a space platform 130 and space tug 120 at the same time.

Figure 2:
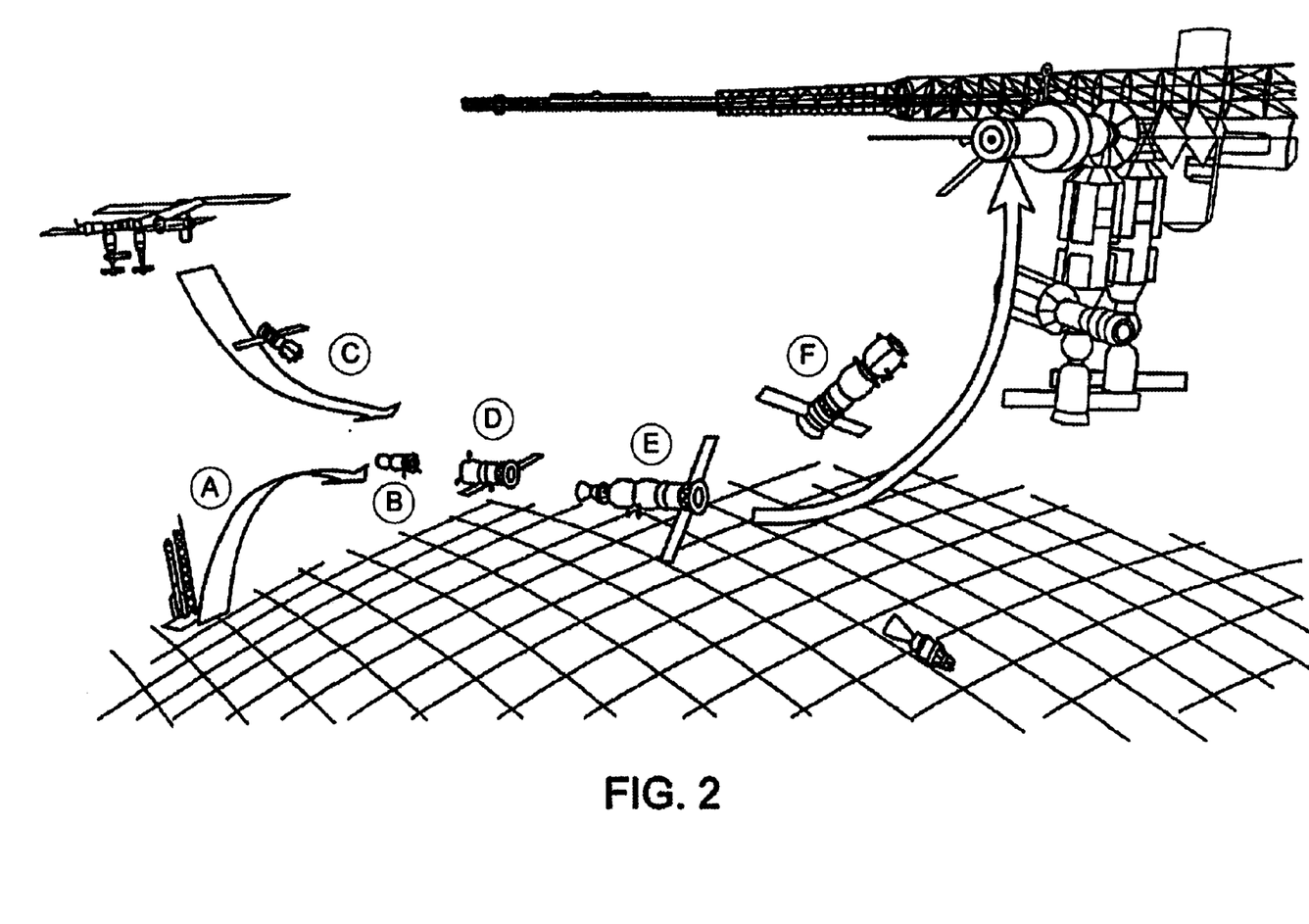
FIG. 2 illustrates a transport sequence.
Figure 3A:
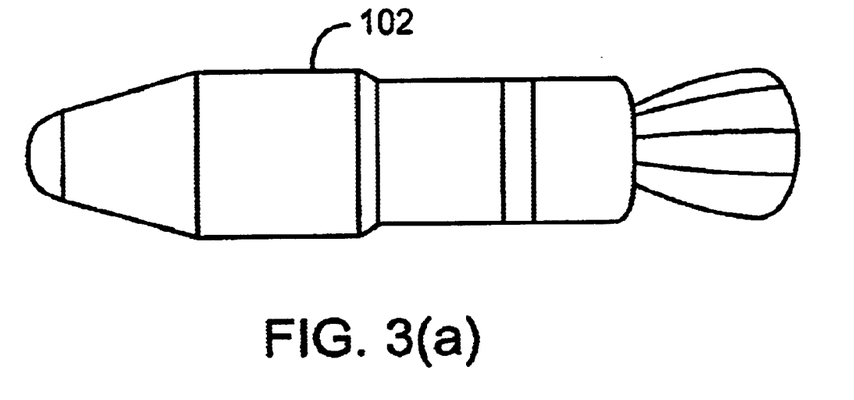
FIG. 3(a) illustrates an,u per stage of a launch vehicle enclosing a launch vehicle element and a canister.
Figure 3B:
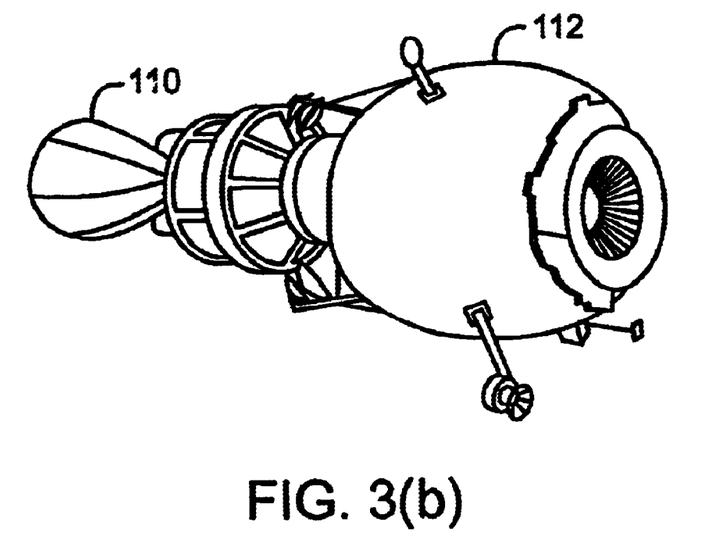
FIG. 3(b) illustrates the launch vehicle element and the canister attached.
Figure 3C:
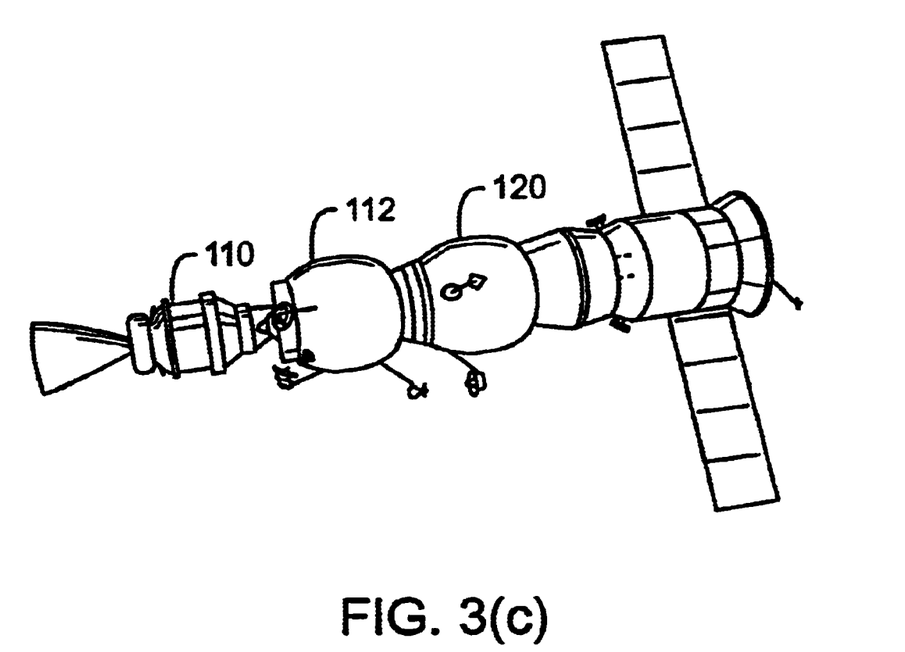
FIG. 3(c) illustrates a docking of the space tug to the canister while it is attached to the launch vehicle element, including deployed antennae.
Figure 3D:
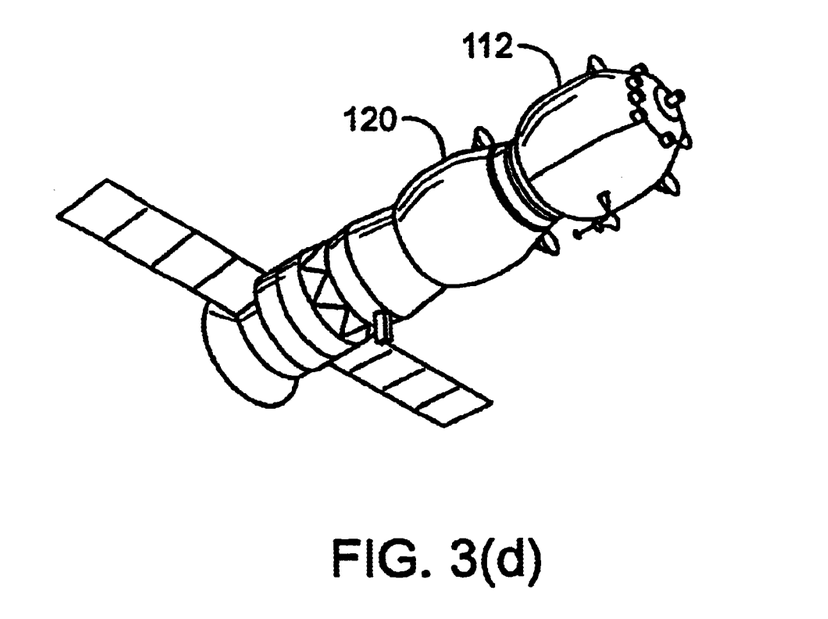
FIG. 3(d) illustrates the space tug with the canister attached to the space tug and detached from the launch vehicle element.
Figure 3E:
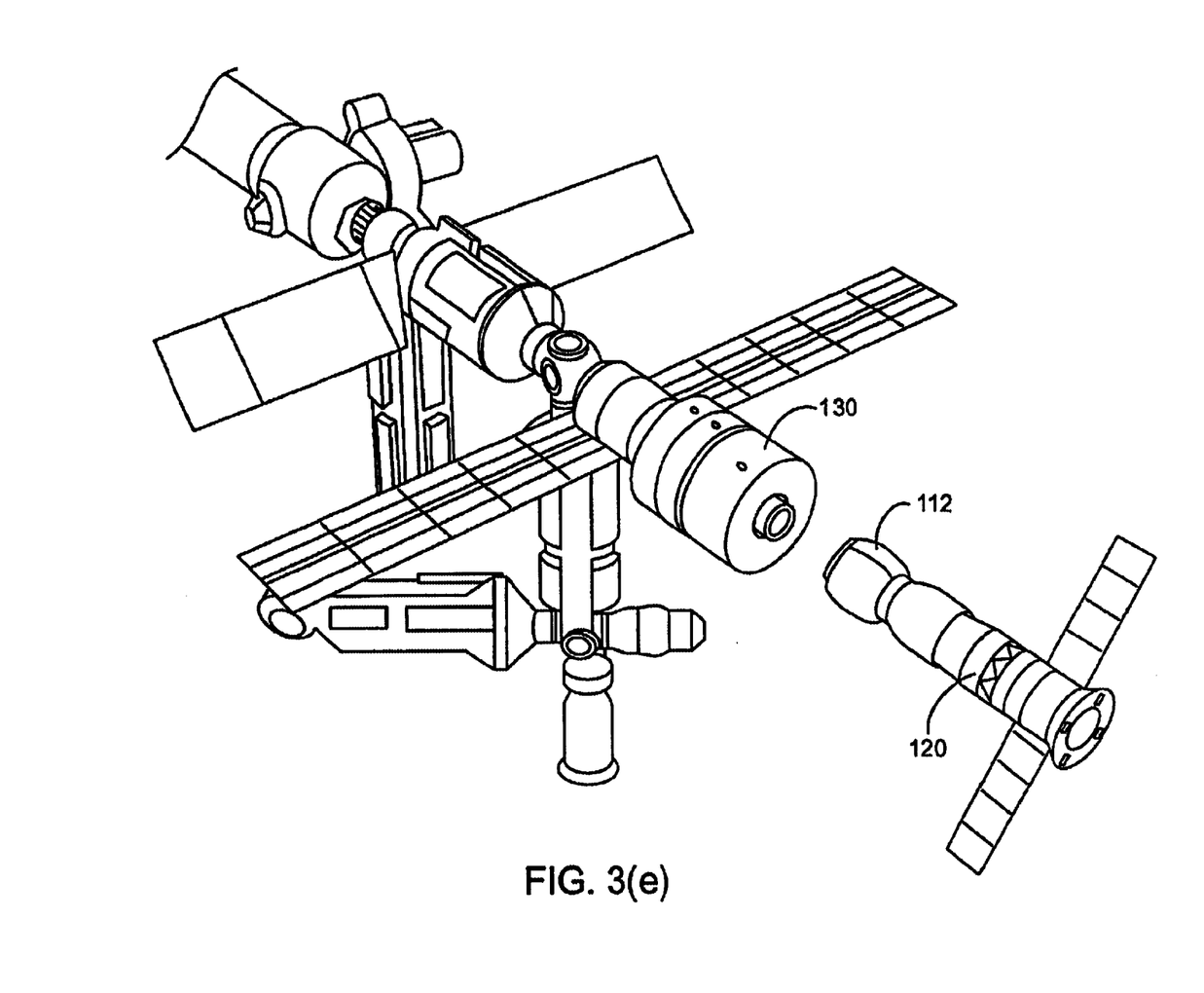
FIG. 3(e) illustrates an approach of the space tug to a space platform while the canister is attached to the space tug, including deployed antennae for signalling and/or communication with the space platform.

FIG. 2 illustrates a transport sequence. The sequence might begin with the launch (A) of a launch vehicle carrying a canister. It should be understood that one launch vehicle might carry more than one canister and canisters might be configured to be "stacked" such that operations that can be performed on a single canister can also be performed on the stack of canisters, treating them as a single canister. Larger launch vehicles, such as SeaLaunch, Proton, Ariane V, Delta IV, Atlas V, etc., might accommodate such canister stacks.

The launch vehicle (or element thereof as shown) with the canister attached maintains a stabilized orientation in space after completion of the launch, so the canister does not need to have its own attitude or propulsion systems. Using this method, the cargo canister could be launched (B) to an orbit appropriate for eventual rendezvous with the space tug. The orbit at this point could be related to the orbit of the space platform, or it could be in an unrelated orbit and possibly a widely distinct orbit.

Once it has been determined that the canister is successfully emplaced in a stable orientation in orbit, the space tug would detach from a docked position at the space platform (C), descend to rendezvous with the canister, and would dock with the available docking port of the payload canister (D). The launch vehicle upper stage could then be jettisoned at this time. Optionally, the space tug could have departed from the space platform prior to the emplacement of the canister in orbit or begin from a home location that is not the same as the destination of the canister contents.

The space tug would then make its way to the space platform (E), carrying the canister to a docking port at the space platform, where standard docking procedures might be followed (F) to attach the canister/tug combination to the space platform. In some cases, a robotic arm (on the space tug or on the space platform) could be used as part of this procedure.

FIG. 3 illustrates various components as might be used in a transport sequence.

Figure 4A:
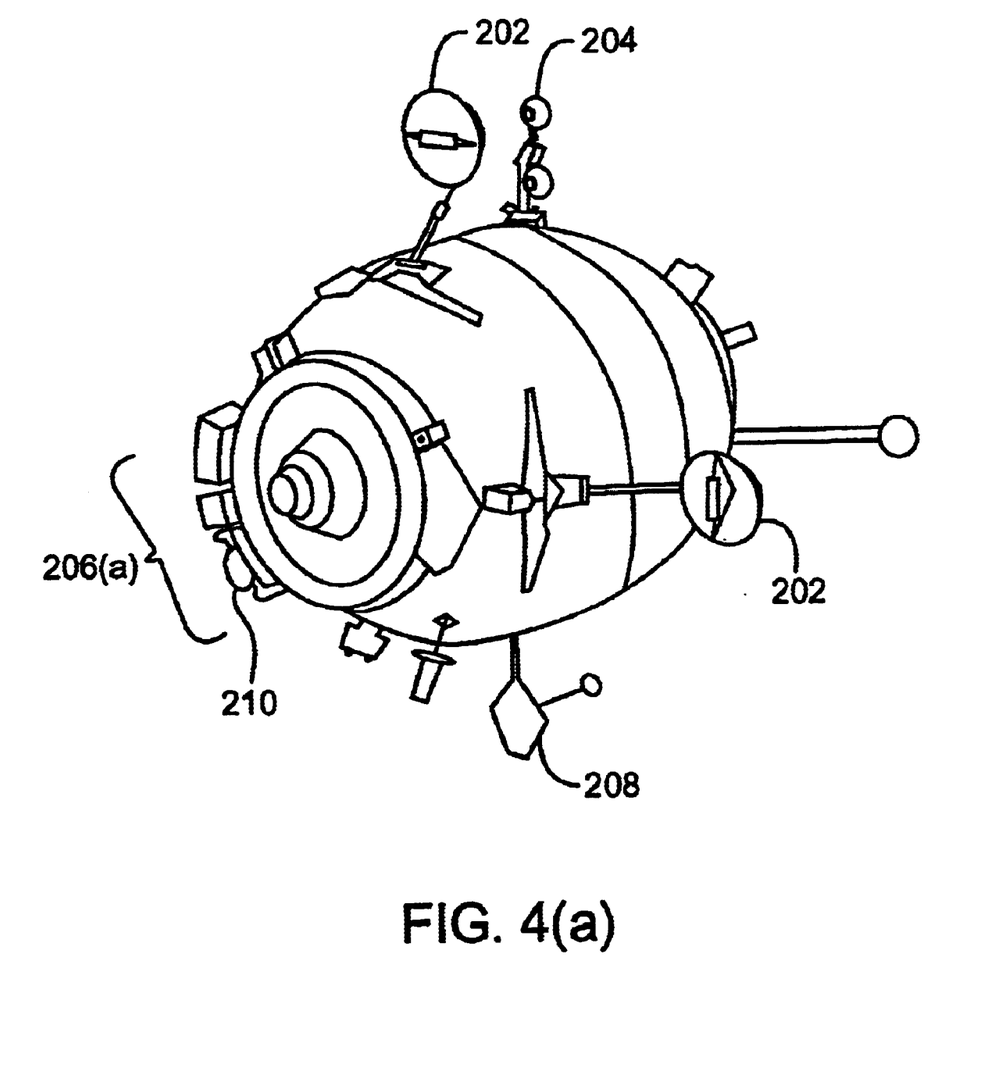
FIG. 4(a) is an illustration of a canister with deployed antennae, showing one docking port.
Figure 4B:
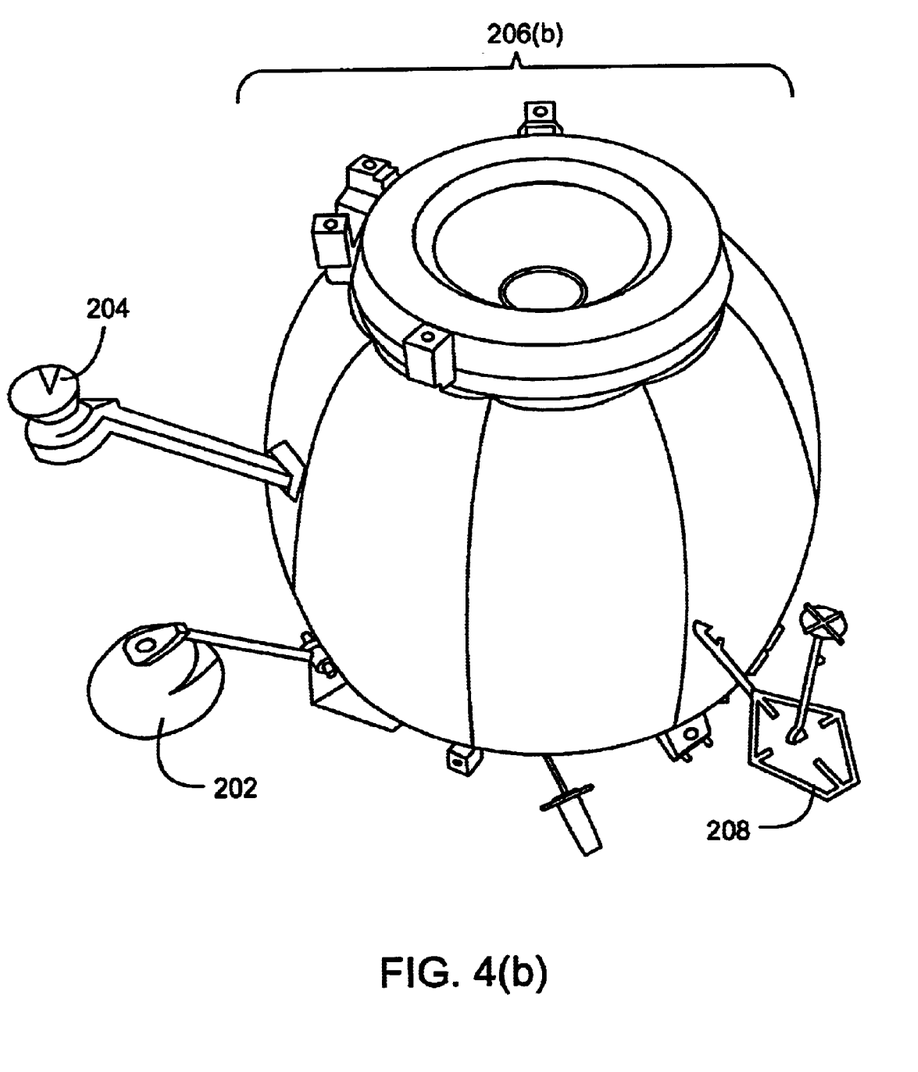
FIG. 4(b) is an illustration of a canister with deployed antennae, showing a second docking port.

FIG. 4(a) is an illustration of a canister, showing deployed antennae 202, 204 and one docking port 206(a). FIG. 4(b) is an illustration of the canister from an opposite view, showing a second docking port 206(b). As illustrated, the canister is somewhat cylindrical, however other shapes are possible. For example, if the canister is pressurized, then sharp corners raise structural engineering issues, but those sharp corners are less of a concern if the canister will remain unpressurized in space. If that is the case, an actual cylinder might be used, or another shape, such as one that conforms to the constraints of a launch vehicle or the expected cargo. In some cases, the canisters would be standardized, but varying sizes and shapes might be accommodated with no change in the other components of the transport system, so long as the docking systems are standardized.

If a standard Progress spacecraft, with its standard Probe docking mechanism, is used as the space tug, then the canister could be a matching standard Cone docking mechanism (206(b) on FIG. 4) on its outer exposed side away from the launch vehicle element to allow space tug docking. The second docking mechanism (206(a) on FIG. 4) at the other end of the cargo canister could be a standard Probe mechanism to allow the canister to dock at a port on the space platform that can also be used with the space tug, ensuring no net loss of specific docking port types at the space platform.

Alternately, the second docking mechanism on the canister may be a mechanism such as the Androgynous Peripheral Attachment System (APAS) or the Hybrid system, which would allow docking of the canister at some port other than one used by the space tug. In yet another variation, the space tug itself could initially be outfitted with an alternate mechanism, such as APAS, and the canister would contain at least one compatible mechanism.

This ability to "mix and match" canister docking mechanisms allows flexibility in the use and placement of the canisters at the platform, and allows the canister to become an "adapter" for converting one type of docking mechanism at the space platform to another with no net loss in the total number of docking ports. Use of a docking mechanism to attach to a manned space platform is superior to alternatives such as berthing via robotic arm, as docking requires little or no interaction with the crew. Docking can be accomplished autonomously using rendezvous radar, whereas berthing via robotic arm requires at least one crew member to manipulate the robotic arm.

Modules with docking mechanisms at both ends are known, such as the Shuttle/Mir Docking Module and ISS Pirs Docking Compartment, but such modules have been delivered using the direct method of transfer to a space platform without an intermediate rendezvous and docking with a space tug. Such techniques generally require the launch vehicle component to be capable of docking, indirectly, with the space platform or require human intervention such as via EVA, at the risk of injury to the crew.

The canister could be pressurized or unpressurized and could contain closed volume and/or open sections suitable to carry cargo. The basic canister has two docking ports, usually on opposite sides of the canister at the axial locations. The canister might contain its own power, communications, and rendezvous subsystems, or might draw on the space launch vehicle and/or upper stage for these resources. The canister needs no provision for its own propulsion or attitude control, relying instead on the launch vehicle or space tug for these functions, so these functions are preferably not present in the canister, thus saving costs and weight.

The canister may contain the associated rendezvous sensors at both ends and connections to allow "pass-through" signalling. This is useful in that a canister's diameter does not have to be limited so that it does not block signalling between the space tug and the launch vehicle element or between the space tug and the space platform. For example, the space tug might use a radar beacon in docking with the space platform. If the canister is so wide that it blocks the signals between the space tug and the space platform, signalling might be impossible or very attenuated.

The canister avoids this problem by providing pass-throughs. For example, if the space tug normally uses a radar dish to send a radar signal, the space tug might also have a connector at the docking port to the canister for feeding the signal to the canister. The canister has a corresponding connector and connections from there to a dish on the opposite side of the canister to convey the signal from the space tug to the other side of the canister, where it can be easily picked up by the space platform. Preferably, the pass-throughs are bidirectional so that the canister conveys signals in both directions.

In a similar fashion, pass-throughs might be needed from the launch vehicle element to the space tug. Those pass-throughs would be on the opposite sides from the other pass-throughs, as they will be used when the canister end distal to the space tug is coupled to the launch vehicle element and the space tug is not yet coupled to the space tug at the canister's proximal end.

Figure 5:
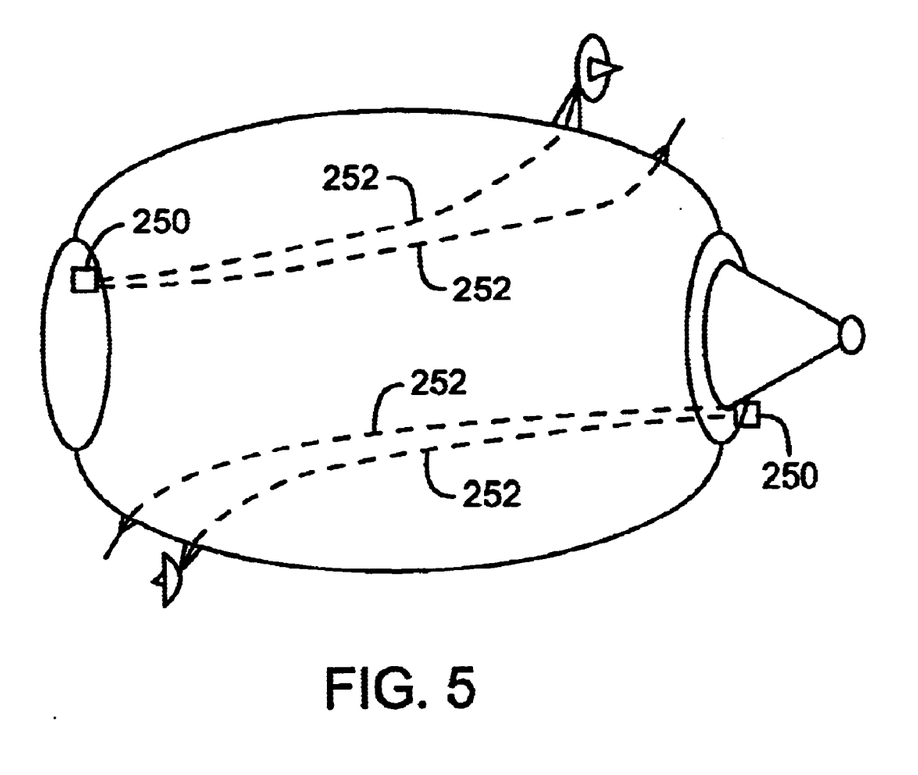
FIG. 5 illustrates signalling pass-throughs of a canister.

FIG. 5 illustrates signalling pass-throughs 252 of a canister where the connection to a docking element is provided via a connector 250. In the case of stacked pass-throughs, the connections of the canisters in the stack could be daisy chained so that the signals pass through the entire stack as if it were one canister and are transmitted or received at the canister closest to the element to which the canister is to be docked.

Pass-throughs are not limited to radar, but might be used or present for communication, telemetry channels, hand-off, canister identification, rendezvous or status of docking equipment and other signalling needs. The pass-throughs could be limited to wiring and a dish or antenna, with the signalling being fully processed before it reaches the canister. In other cases, some signal processing can be performed on the canister, such as by circuits, logic or computer processes. Of course, instead of radio communication via a dish or antenna, the pass-through can be entirely wired, to handle pass-throughs when the canister is attached to objects at both ends.

The canister's rendezvous system could include electronic sensors that provide a signal to the space tug, using a compatible rendezvous system, of sufficient resolution to locate the canister in orbit, approach the canister, and to dock with the canister. A current example of such a rendezvous system is the Kurs S-band radar used at the International Space Station, but any rendezvous system that allows the space tug to dock with the canister can be used.

The exemplary canister shown in FIG. 4 contains various attachments, such as Kurs active radar antennae 202, a Kurs passive radar antenna 204, Cone/Probe docking ports 206, a docking target 208 and a Kurs active scanning antenna 210.

While the canister is docked at the platform, the space tug could disengage from the canister, exposing the canister's second docking port. Because standard docking ports can be opened and closed like doors, this port could be used by other subsequently docked vehicles, modules, or canisters as a transfer point into the space platform.

Additionally, previously attached canisters could be undocked from the space platform once they had been filled with equipment and material from the space platform that is to be discarded through destructive re-entry or returned to Earth after docking with an Earth-return system, or by other techniques.

While the canister can be used to hold supplies to be provided to the platform, the canister itself might be considered part of what is being supplied. For example, if the platform needed additional volume (pressurized or unpressurized), the canister could "supply" that additional volume. Specific applications of such a volume can include having the canister outfitted as a long-duration space station module with specialized equipment, a hotel room for guests, a sleeping room for crew, a garage for satellite repair, stowage "closet" for station equipment or garbage, etc.

Although space platforms are described herein with reference to platforms in orbits, the invention is general enough to be applicable to platforms that are not considered in orbit around a particular celestial body. For example, if the platform is not in orbit around the Earth, the Moon or other planets, but is a base for operations near asteroids or comets or in open space, it might be said to not be "in orbit", but the inventions described herein could be used with such platforms.

Examples of spacecraft in active use that could be adapted to perform the space tug role include the Russian Soyuz and Progress vehicles. One such modification is eliminating the landing gear and other elements associated with landing on a planet or moon surface. With the space tug and the canisters using compatible ports, they can be securely attached for maneuvers. The same is true for the launch vehicle element.

The canisters can be made inexpensively with standard, proven parts. With two docking ports on the canister, orbital stabilization provided external to the canister and the availability of a space tug, easier, lower cost and simpler space platform supply becomes available. Thermal control might also be provided external to the canister.

In certain cases, versions of this canister can be built with existing technology quickly for a much lower total cost than systems using direct transport architecture and can be operated without requiring human intervention in docking. Preferably, the canisters are standardized. For example, if the two docking are standard, they can connect to a wide variety of launch platforms and a wide variety of space platforms and one space tug or one class of space tugs could support many different canisters.

Novel techniques for supply transport in space have now been presented. The invention has now been described with reference to the preferred embodiments. Alternatives and substitutions will now be apparent to persons of skill in the art. Accordingly, it is not intended to limit the invention except as provided by the appended claims.

What is claimed is:

1. A method of providing supply to a space platform, comprising:
   launching a supply canister into orbit using a launch vehicle, wherein the supply canister includes at least two docking ports and is adapted to allow for the at least two docking ports to be used simultaneously;
   docking an intermediate space vehicle to a first docking port of the at least two docking ports while the supply canister is docked to the launch vehicle at a second docking port of the at least two docking ports, wherein the launch vehicle is at least a stabilized component of the launch vehicle used to launch the supply canister into orbit;
   using the intermediate space vehicle to position the supply canister relative to the space platform; and
   docking the supply canister to the space platform while the intermediate space vehicle is attached to the supply canister.

2. The method of claim 1, further comprising a step of pressurizing the supply cargo canister.

3. The method of claim 1, wherein the stabilization provided by the launch vehicle is three-axis stabilization.

4. The method of claim 1, further comprising signalling between two docking elements to facilitate a docking of the supply canister to a first of the two docking elements while the supply canister is docked to the second of the two docking elements, wherein such signalling passes through signalling extensions of the supply canister.

5. The method of claim 4, wherein the first docking element is the intermediate space vehicle and the second docking element is the launch vehicle.

6. The method of claim 4, wherein the first docking element is the space platform and the second docking element is the intermediate space vehicle.

7. The method of claim 4, wherein the signalling is passive radar.

8. The method of claim 4, wherein the signalling is active radar.

9. The method of claim 4, wherein the signalling is rendezvous signalling.

10. A supply canister, usable in orbit, comprising:
    an internal space for containing supply material;
    a power subsystem for supplying power to canister components; and
    at least two docking ports adapted to allow for simultaneous docking of two elements, wherein the supply canister relies on a docking element to provide at least one of orbital stability and propulsion from one or both of the docked elements;
    wherein the supply canister has no means for propulsion while in orbit and no means for stabilizing the supply canister against rotation while in orbit and has means for connecting supply canister electrical system with an electrical system of an element docked at a docking port of the supply canister.

11. The supply canister of claim 10, wherein the supply canister is an unpressurized canister.

12. The supply canister of claim 10, wherein the supply canister is a pressurized canister.

13. The supply canister of claim 10, wherein the supply canister is approximately cylindrical and the at least two docking ports include one docking port at a first axial location of an approximate cylinder and a second docking port at a second axial location opposite the first axial location.

14. The supply canister of claim 10, wherein the supply canister is approximately cylindrical and is shaped to support pressurization without concentrated stress points.

15. A supply canister, usable in orbit, comprising:
    an internal space for containing supply materiel;
    a power subsystem for supplying power to canister components; and
    at least two docking ports adapted to allow for simultaneous docking of two elements, wherein the supply canister relies on a docking element to provide at least one of orbital stability and propulsion from one or both of the docked elements;
    wherein the at least two docking ports include a first docking port at a first axial location of an approximate cylinder that is a Cone docking port and a second docking port at a second axial location opposite the first axial location that is a Probe docking port.

16. The supply canister of claim 15, further comprising a communication subsystem for communicating with elements docked to the supply canister or elements to be docked to the supply canister.

17. A supply canister, usable in orbit, comprising:
an internal space for containing supply materiel;
a power subsystem for supplying power to canister components; and
at least two docking ports adapted to allow for simultaneous docking of two elements, wherein the supply canister relies on a docking element to provide at least one of orbital stability and propulsion from one or both of the docked elements;
further comprising a rendezvous subsystem for assisting in automated or semi-automated docking of the supply canister with a docking element.

18. A supply canister, usable in orbit, comprising:
an internal space for containing supply materiel;
a power subsystem for supplying power to canister components; and
at least two docking ports adapted to allow for simultaneous docking of two elements, wherein the supply canister relies on a docking element to provide at least one of orbital stability and propulsion from one or both of the docked elements;
further comprising:
a communication subsystem for communicating with elements docked to the supply canister or elements to be docked to the supply canister; and
a rendezvous subsystem for assisting in automated or semi-automated docking of the supply canister with a docking element.

19. A supply canister, usable in orbit, comprising:
an internal space for containing supply materiel;
a power subsystem for supplying power to canister components; and
at least two docking ports adapted to allow for simultaneous docking of two elements, wherein the supply canister relies on a docking element to provide at least one of orbital stability and propulsion from one or both of the docked elements;
wherein the at least two docking ports include a first docking port that is a Cone docking port and a second docking port that is a Probe docking port, wherein the supply canister is adapted to be docked to an intermediate space vehicle at the Cone docking port and a launch vehicle at the Probe docking port simultaneously.

20. A supply canister, usable in orbit, comprising:
an internal space for containing supply materiel;
a power subsystem for supplying power to canister components; and
at least two docking ports adapted to allow for simultaneous docking of two elements, wherein the supply canister relies on a docking element to provide at least one of orbital stability and propulsion from one or both of the docked elements;
wherein the at least two docking ports include a first docking port that is a Cone docking port and a second docking port that is a Probe docking port, wherein the supply canister is adapted to be docked to an intermediate space vehicle at the Cone docking port and a space platform at the Probe docking port simultaneously.

21. A supply canister, usable in orbit, comprising:
an internal space for containing supply materiel; and
at least two docking ports adapted to allow for simultaneous docking of two elements; and
pass-through signal means for passing signals between a first element docked to the supply canister and a second element to which the supply canister is to be docked.

22. The supply canister of claim 21, wherein the docking elements are an intermediate space vehicle and a launch vehicle element.

23. The supply canister of claim 21, wherein the docking elements are a space platform and an intermediate space vehicle.

24. The supply canister of claim 21, wherein the signalling is passive radar.

25. The supply canister of claim 21, wherein the signalling is active radar.

26. The supply canister of claim 21, wherein the signalling is rendezvous signalling.

27. A supply canister, usable in orbit, comprising:
an internal space for containing supply materiel;
a rendezvous subsystem for assisting in automated or semi-automated docking of the supply canister with a docking element; and
at least two docking ports adapted to allow for simultaneous docking of two elements, wherein the supply canister relies on a docking element to provide at least one of orbital stability and propulsion from one or both of the docked elements.

28. The supply canister of claim 27, wherein the supply canister has no means for propulsion while in orbit and no means for stabilizing the supply canister against rotation while in orbit and has means for connecting supply canister electrical system with an electrical system of an element docked at a docking port of the supply canister.

29. The supply canister of claim 27, wherein the supply canister is approximately cylindrical and the at least two docking ports include one docking port at a first axial location of an approximate cylinder and a second docking port at a second axial location opposite the first axial location.

30. The supply canister of claim 27, wherein the at least two docking ports include a first docking port at a first axial location of an approximate cylinder that is a Cone docking port and a second docking port at a second axial location opposite the first axial location that is a Probe docking port.

31. The supply canister of claim 27, wherein the at least two docking ports include a first docking port that is a Cone docking port and a second docking port that is a Probe docking port, wherein the supply canister is adapted to be docked to an intermediate space vehicle at the Cone docking port and a launch vehicle at the Probe docking port simultaneously.

32. The supply canister of claim 27, wherein the at least two docking ports include a first docking port that is a Cone docking port and a second docking port that is a Probe docking port, wherein the supply canister is adapted to be docked to an intermediate space vehicle at the Cone docking port and a space platform at the Probe docking port simultaneously.

* * * * *